(12) United States Patent  (10) Patent No.: US 8,144,314 B2
Yamamoto  (45) Date of Patent: Mar. 27, 2012

(54) SPECTRAL MEASUREMENT APPARATUS AND MEASUREMENT METHOD UTILIZING BRILLOUIN SCATTERING

(75) Inventor: Yoshinori Yamamoto, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 827 days.

(21) Appl. No.: 12/071,059

(22) Filed: Feb. 14, 2008

(65) Prior Publication Data

US 2008/0193126 A1    Aug. 14, 2008

(30) Foreign Application Priority Data

Feb. 14, 2007 (JP) ................................ P2007-033913

(51) Int. Cl.
*G01N 21/00* (2006.01)
(52) U.S. Cl. ...................................... 356/73.1
(58) Field of Classification Search ........................ None
See application file for complete search history.

(56) References Cited

U.S. PATENT DOCUMENTS

| | | | | |
|---|---|---|---|---|
| 4,997,277 | A * | 3/1991 | Horiguchi et al. | 356/73.1 |
| 6,237,421 | B1 * | 5/2001 | Li et al. | 73/800 |
| 6,547,453 | B1 * | 4/2003 | Stummer et al. | 385/88 |
| 7,245,790 | B2 * | 7/2007 | Brown et al. | 385/12 |
| 7,515,273 | B2 * | 4/2009 | Bernini et al. | 356/477 |
| 7,534,031 | B2 * | 5/2009 | Yamamoto et al. | 374/130 |
| 7,543,982 | B2 * | 6/2009 | Yamamoto et al. | 374/131 |
| 7,576,840 | B2 * | 8/2009 | Yamamoto | 356/35.5 |
| 7,679,732 | B2 * | 3/2010 | Hotate et al. | 356/73.1 |

(Continued)

FOREIGN PATENT DOCUMENTS

EP    1 568 981 A2    8/2005

(Continued)

OTHER PUBLICATIONS

Hotate, Kazuo et al., "Simplified System of Fiber Brillouin Optical Correlation Domain Analysis for Distributed Strain Sensing," OFS-16, pp. 290-293, 2003.*

(Continued)

*Primary Examiner* — Tarifur Chowdhury
*Assistant Examiner* — Gordon Stock, Jr.
(74) *Attorney, Agent, or Firm* — Venable LLP; Michael A. Sartori; Christopher Ma

(57) ABSTRACT

The present invention relates to a spectral measurement apparatus and measurement method utilizing Brillouin scattering, which judge the state of the temperature or strain of an optical fiber more quickly. The spectral measurement apparatus comprises a light source, an analysis section, and an anomaly judgment section. The light source outputs pumping light and probe light. The pumping light and probe light thus output are caused to enter in opposite directions to the sensing fiber. The analysis section analyzes the gain received by the probe light as a result of the Brillouin scattering. The anomaly judgment section judges the state relating to the temperature or strain of the sensing fiber on the basis of the analysis result of the analysis section. The frequency difference $\nu$ between the pumping light and probe light is set within a predetermined frequency difference setting range. The frequency difference setting range is a range which includes the frequency difference at which the peak value of the reference gain spectrum of the gain received by the probe light is obtained when the temperature or strain of the sensing fiber is in the reference state and is set at or below the line width of the reference gain spectrum

11 Claims, 12 Drawing Sheets

U.S. PATENT DOCUMENTS

| | | | |
|---|---|---|---|
| 7,719,666 B2* | 5/2010 | Kishida et al. | 356/73.1 |
| 8,013,986 B2* | 9/2011 | Hartog | 356/73.1 |
| 2003/0007142 A1* | 1/2003 | Hotate et al. | 356/73.1 |
| 2005/0207752 A1* | 9/2005 | Kwon et al. | 398/25 |
| 2006/0018586 A1 | 1/2006 | Kishida | |
| 2006/0285850 A1 | 12/2006 | Colpitts et al. | |
| 2008/0130707 A1* | 6/2008 | Yamamoto et al. | 374/131 |
| 2010/0054298 A1* | 3/2010 | Sasaoka et al. | 374/1 |
| 2010/0225900 A1* | 9/2010 | Hotate et al. | 356/73.1 |
| 2010/0238427 A1* | 9/2010 | Sasaoka et al. | 356/73.1 |

FOREIGN PATENT DOCUMENTS

| | | | |
|---|---|---|---|
| GB | 2329960 A | * | 4/1999 |
| JP | 2004-101472 | | 4/2004 |
| WO | WO-2004/040241 A1 | | 5/2004 |

OTHER PUBLICATIONS

Yamauchi, Toyohiko et al., "Distributed and Dynamic Strain Measurement by BOCDA with Time-Division Pump-Probe Generation Scheme," Optical Society of America, pp. 1-2, 2003.*

"Kazuo Hotate et al.," "A Correlation—Based Continuous-Wave technique for measurement of dynamic strain along an optical fiber using Brillouin scattering with fully distributed ability", 2002 15$^{th}$ Optical Fiber Sensors Conference Technical Digest, May 6-10, 2002.

Kazuo Hotate et al., "Distributed Dynamic Strain Measurement Using a Correlation-Based Brillouin Sensing System," vol. 15, No. 2, Feb. 2003, pp. 272-274.

* cited by examiner

SPECTRAL MEASUREMENT APPARATUS AND MEASUREMENT METHOD UTILIZING BRILLOUIN SCATTERING

BACKGROUND OF THE INVENTION

1. Field of the Invention

The present invention relates to a spectral measurement apparatus and measurement method utilizing Brillouin scattering which is generated in an optical fiber to judge the state of the temperature of the optical fiber or the strain of the optical fiber (to sense an anomaly).

2. Related Background Art

The Brillouin gain spectrum (referred to as the 'BGS' hereinbelow), representing the gain which is obtained as a result of the Brillouin scattering generated in the optical fiber, changes in accordance with the temperature and strain of the optical fiber. Technology that utilizes this change in the BGS to measure the temperature or strain of the optical fiber is known.

The document (Kazuo Hotate and Sean Ong Soon Leng, "A Correlation-Based Continuous-Wave technique for measurement of dynamic strain along an optical fiber using Brillouin scattering with fully distributed ability", Technical Digest of OFS-15, PD5 (2002)) describes technology for measuring the BGS at respective positions within the optical fiber. In the technology that appears in this document, pumping light and probe light are first caused to enter in opposite directions from the each end of the optical fiber. Thereupon, Brillouin scattering is generated as a result of the pumping light being propagated within the optical fiber and the probe light is subjected to Brillouin gain as a result of the Brillouin scattering. The pumping light and probe light are frequency-modulated sinusoidally and the probe light obtains the Brillouin gain mainly at a correlation peak position where the correlation between the pumping light and probe light increases.

The BGS is measured by fixing the correlation peak position of the optical fiber and sweeping the frequency difference between the pumping light and probe light at the correlation peak position to measure the Brillouin gain received by the probe light. The shape of the BGS changes depending on the temperature and strain of the optical fiber in the correlation peak position and, therefore, by measuring the BGS by establishing the respective positions in the longitudinal direction of the optical fiber in the correlation peak position, the temperature distribution and strain distribution states in the longitudinal direction of the optical fiber can be found.

SUMMARY OF THE INVENTION

The present inventors have examined the above prior art, and as a result, have discovered the following problems.

Here, when a superconductor exceeds any one critical point for the temperature, magnetic field, or current density, the superconducting state is broken (normal conduction state) and an exothermic state is produced, whereby the temperature of the superconductor rises suddenly. In order to prevent this phenomenon, the temperature distribution of the superconductor must be measured and monitored constantly. Therefore, consideration has been given to measuring the temperature distribution of the superconductor by winding an optical fiber around a superconductor and using the technology described in the above-mentioned document to measure the temperature in the longitudinal direction of the optical fiber. In this case, the measurement speed of the temperature distribution is problematic.

The above-mentioned document discloses the fact that the BGS is measured by sweeping the frequency difference in the range 10.8 to 11.0 GHz and measuring the Brillouin gain received by the probe light over 100 frequency difference points with an interval of 2 MHz and a sampling rate of 8.8 Hz. That is, with the method that appears in this document, measurement of the temperature at one point of the optical fiber takes approximately 0.114 seconds. That is, in cases where the temperature distribution of the optical fiber is measured by performing temperature measurement at 100 points in the longitudinal direction of the optical fiber, the measurement takes on the order of 11.4 seconds.

Because the measurement speed of the method appearing in the above-mentioned document is slow, sensing of a rise in temperature is slow and the phenomenon where the temperature of the superconductor rises suddenly cannot be prevented.

The present invention has been developed to eliminate the problems described above. It is an object of the present invention to provide a measurement apparatus and a measurement method which make it possible to judge the state of the temperature or strain of the optical fiber more quickly.

A spectral measurement apparatus according to the present invention, which is an apparatus sensing an anomaly in an optical fiber by utilizing Brillouin scattering generated in the optical fiber as a sensor section, comprises the sensor section or the structure serving to make the sensor section be detachable. The spectral measurement apparatus basically comprises a light source, a probe light output-end, a pumping light output-end, an analysis section, and a judgment section.

The light source outputs pumping light and probe light. The probe light output-end supplies the probe light from the light source to one end of the optical fiber. The pumping light output-end supplies the pumping light from the light source to the other end of the optical fiber. The analysis section analyzes the gain received by the probe light within the optical fiber as a result of Brillouin scattering which is generated due to the pumping light being propagated within the optical fiber. The judgment section judges a state relating to the temperature or strain of the optical fiber on the basis of the analysis result of the analysis section.

In particular, in the spectral measurement apparatus, the frequency difference between the pumping light and the probe light, which propagate within the optical fiber, is a range including a frequency difference at which the peak value of the reference gain spectrum of the gain received by the probe light is obtained when the temperature or strain of the optical fiber is in the reference state, and is set within a frequency difference setting range equal to or less than the line width of the reference gain spectrum.

In accordance with the spectral measurement apparatus according to the present invention, the analysis of the Brillouin gain by the analysis section is with respect to a frequency difference included in a frequency difference setting range including the frequency difference at which the peak value of the reference gain spectrum is obtained, when a state relating to the temperature or strain of the optical fiber is judged, adequate information can be obtained. Furthermore, the analysis is performed with respect to the frequency difference included in a range equal to or less than a line width of the reference gain spectrum and there is no need to perform an analysis with respect to the frequency difference outside this range. That is, the measurement time of the Brillouin gain can be shortened. The judgment of the state of the temperature or strain can therefore be made more quickly.

In cases where the optical fiber as the sensor section is constituted to be detachably attached to the apparatus main body, the spectral measurement apparatus according to the present invention preferably further comprises a first connector optically connecting one end of the optical fiber and the probe light output-end, and a second connector optically connecting the other end of the optical fiber and the pumping light output-end.

The spectral measurement apparatus according to the present invention preferably further comprises an alarm signal output section (reporting section) which outputs an alarm signal for reporting an anomaly regarding temperature or strain on the basis of the judgment result of the judgment section. In this case, because a judgment of the state of the temperature or strain is performed more quickly and an alarm signal for reporting an anomaly is outputted, an anomaly can be rapidly reported.

The analysis section preferably analyzes the spectrum of the gain received by the probe light with respect to the frequency difference included in the frequency difference setting range, and the judgment section judges the existence of an anomaly on the basis of the existence of a maximum value of the spectrum analyzed by the analysis section. In this case, the fact that the maximum value is not included in the spectrum analyzed by the analysis section indicates that the frequency difference with which the peak value of the spectrum of the Brillouin gain obtained by the probe light is obtained is equal to or more than a predetermined value. This means that the temperature or strain of the optical fiber has changed by a predetermined amount or more and an anomaly has occurred. It is therefore possible to reliably judge an anomaly of the optical fiber on the basis of the existence of the maximum value of the spectrum of the gain received by the probe light with respect to the frequency difference in this range.

Additionally, in the spectral measurement apparatus according to the present invention, the analysis section analyzes the gain received by the probe light with respect to two frequency differences included in the frequency difference setting range, and the judgment section judges the existence of an anomaly by comparing the ratio between the two gains analyzed by the analysis section and a preset reference ratio. In this case, the fact that the ratio of the two gains analyzed by the analysis section has shifted by a predetermined value or more with respect to the reference ratio indicates that the spectrum of the Brillouin gain obtained by the probe light has changed by a predetermined amount or more. This means that the temperature or strain of the optical fiber has changed by a predetermined amount or more and an anomaly has occurred. It is therefore possible to reliably judge an anomaly of the optical fiber by comparing the two gains analyzed by the analysis section and the reference ratio.

In the spectral measurement apparatus according to the present invention, the analysis section analyzes the gain received by the probe light with respect to one frequency difference included in the frequency difference setting range; and the judgment section judges the existence of an anomaly by comparing one gain analyzed by the analysis section and a preset reference value. In this case, the fact that the one gain analyzed by the analysis section has shifted by a predetermined value or more with respect to the reference value means that the spectrum of the Brillouin gain obtained by the probe light has changed by a predetermined amount or more. This means that the temperature or strain of the optical fiber has changed by a predetermined amount or more and an anomaly has occurred. That is, an anomaly of the optical fiber can be reliably judged by comparing the one gain analyzed by the analysis section and a predetermined value.

The spectral measurement apparatus according to the present invention further comprises a first coupler, delay means, a second coupler, and a photodiode. The light source is preferably one light source which alternately outputs pumping light and probe light. The first coupler splits the pumping light and probe light which are outputted from the light source. The delay means delays the pumping light or probe light thus split by the first coupler and outputs the delayed light to the optical fiber. The second coupler extracts the probe light which is outputted from the optical fiber after obtaining gain in the optical fiber. The photodiode receives probe light outputted from the second coupler.

In the above constitution, because the pumping light and probe light are alternately outputted from one light source, the frequency difference can be finely controlled. Further, the pumping light and probe light outputted from the light source are split by the first coupler and the timing with which the pumping light and probe light enter the optical fiber can be adjusted as a result of the delay supplied by the delay means. Thereafter, the probe light obtained with gain in the optical fiber is extracted as a result of being split by the second coupler and is received by the photodiode. The analysis section performs the above analysis on the basis of an electrical signal outputted from the photodiode. Thus, the analysis can be accurately performed and an anomaly can be reliably judged.

The spectral measurement method according to the present invention comprises the steps of disposing an optical fiber close to an object or in a state of contact with the object and using a spectral measurement apparatus with the above structure to sense an anomaly of the object. In this case, because the temperature or strain of the optical fiber changes in accordance with the change in the temperature or strain of the object, an anomaly of the object can be judged by judging an anomaly of the optical fiber.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1:
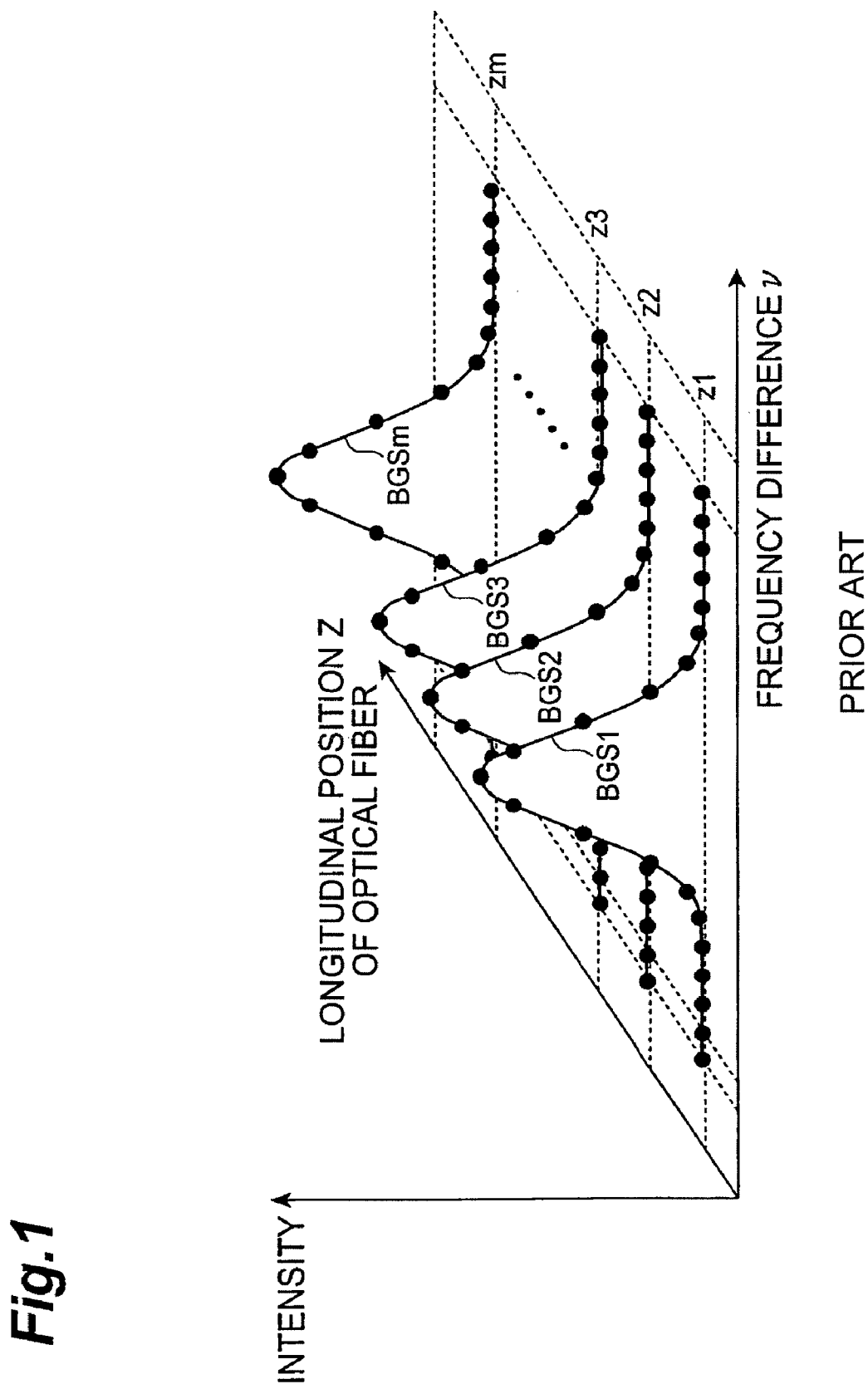
FIG. 1 is a graph showing the BGS measurement results of conventional BOCDA.

In the following, embodiments of a spectral measurement apparatus and measurement method utilizing Brillouin scattering the present invention will be explained in detail with reference to FIGS. 1 to 12. In the description of the drawings, identical or corresponding components are designated by the same reference numerals, and overlapping description is omitted.

The spectral measurement apparatus according to the present invention is an apparatus which senses anomalies in the temperature distribution or strain distribution of an object by utilizing the Brillouin scattering phenomenon, and emit an alarm signal. The spectral measurement method according to the present invention is implemented by utilizing this kind of spectral measurement apparatus. The Brillouin scattering phenomenon is a phenomenon whereby, when light (pumping light) is propagated within an optical fiber, an acoustic wave is generated within the fiber by the pumping light and, as a result of the interaction between the pumping light and the acoustic wave, a part of the pumping light which is downshifted in frequency is backscattered.

For example, in cases where BOCDA (Brillouin Optical Correlation Domain Analysis) is employed, when probe light is introduced to an optical fiber in the opposite direction to pumping light, probe light obtains gain as a result of Brillouin scattering at the correlation peak position in which there is a strong correlation between the pumping light and probe light. The gain received by the probe light changes depending on the temperature and strain of the optical fiber at the correlation peak position and on the frequency difference ν between the pumping light and probe light at the correlation peak position.

The BGS can be measured by fixing the correlation peak position of the optical fiber and sweeping the frequency difference ν between the pumping light and probe light at the correlation peak position to measure the Brillouin gain received by the probe light. The BGS is the Lorentz spectrum represented by Equation (1).

$$g_B(\nu) = \frac{g_0}{1 + \{2(\nu - \nu_B)/\Delta\nu_B\}^2} \quad (1)$$

In Equation (1), $g_B(\nu)$ represents the gain of the Brillouin scattering received by the probe light; $g_0$ represents the peak value, $\nu_B$ represents the frequency difference ν at the peak value, and $\Delta\nu_B$ represents the full width at half maximum.

The shape of the BGS changes depending on the temperature and strain at the correlation peak position. Therefore, as shown in FIG. 1, by measuring the BGS by establishing the respective positions in the longitudinal direction of the optical fiber in the correlation peak position, the state of the temperature distribution or strain distribution of the optical fiber can be found. FIG. 1 is a graph showing the BGS in respective positions in the longitudinal direction of the optical fiber. In FIG. 1, the X axis represents the frequency difference ν, the Y axis represents the intensity of the gain, and the Z axis represents the positions Z1 to Zm in the longitudinal direction of the optical fiber.

BGS1 can be obtained by causing pumping light and probe light to enter in opposite directions to the optical fiber with a correlation peak position set at position Z1 and measuring the Brillouin gain obtained by the probe light by sweeping the frequency difference ν between the pumping light and probe light. BGS2 to BGSm can similarly each be obtained for the respective positions Z2 to Zm of the optical fiber.

Figure 2:
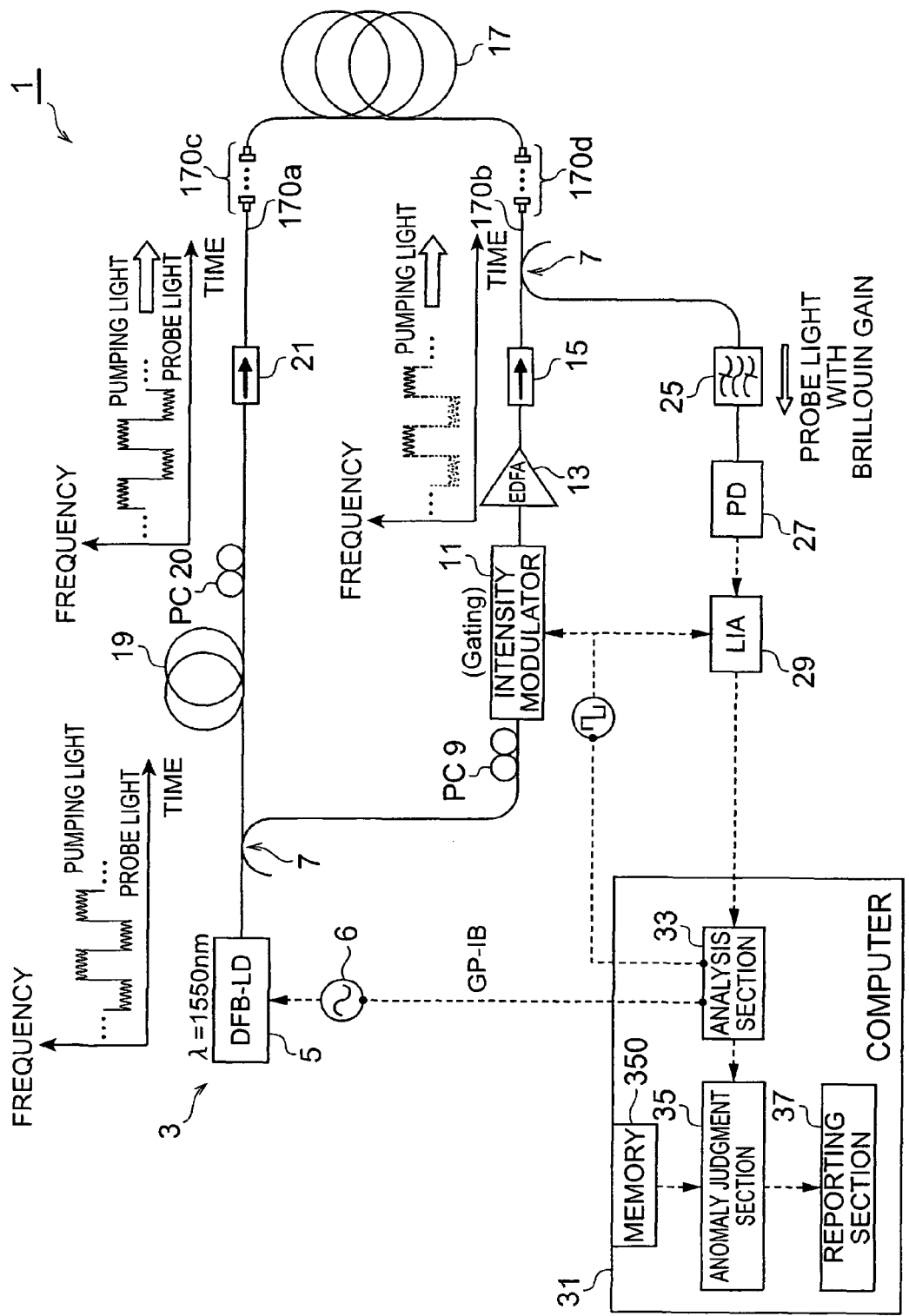
FIG. 2 is a view showing the constitution of an embodiment of the spectral measurement apparatus according to the present invention.

The spectral measurement apparatus and spectral measurement method according to the present invention use BOCDA to sense an anomaly of the temperature distribution or strain distribution of the optical fiber by measuring the Brillouin gain obtained by the probe light at the respective positions in the longitudinal direction of the optical fiber. FIG. 2 is a view showing the constitution of an embodiment of the spectral measurement apparatus (spectral measurement apparatus according to the present invention) for the purpose of implementing the spectral measurement method according to the present invention.

The spectral measurement apparatus according to the present invention comprises an apparatus main body 1, and a sensing fiber 17 (sensing section) which can be attached to and detached from the apparatus main body 1. The apparatus main body 1 comprises a probe light output terminal 170a and a pumping light output terminal 170b and one end of the probe light output terminal 170a and one end of the sensing fiber 17 are optically connected via a first connector 170c. Further, the respective other ends of the pumping light output terminal 170b and sensing fiber 17 are optically connected via a second connector 170d. The apparatus main body 1 comprises a light source 3 and the light source 3 outputs pumping light and probe light as follows. First, pumping light and probe light are alternately generated with time division by one LD5 as a result of the LD5 being driven with rectangular direct frequency modulation by a waveform generator 6. The amplitude of the rectangular direct frequency modulation is on the order of 10 to 11 GHz, with the higher frequencies used as the pumping light and the lower frequencies used as the probe light. The amplitude of the direct frequency modulation corresponds to the frequency difference ν between the center frequency of the pumping light and the center frequency of the probe light when same are outputted from light source 3. The light source 3 controls the frequency difference ν by changing the amplitude of the direct frequency modulation. In the constitution of FIG. 2, one light source 3 is used to output pumping light and probe light and, therefore, the frequency difference between the pumping light and probe light can be finely controlled.

A sine wave component on the order of an amplitude of 1 GHz is added by the waveform generator 6 to the direct frequency modulation waveform. The light source 3 controls the correlation peak position in the sensing fiber 17, at which the frequency difference ν between the pumping light and probe light keeps constant, by controlling the phase difference of the sine wave component added to the pumping light and probe light. Since the probe light obtains Brillouin gain mainly at the correlation peak position, the Brillouin gain at the correlation peak position is measured.

The pumping light and probe light, which are outputted from the LD5, are split into two paths by a coupler 7. The first light split by the coupler 7 passes through a polarization controller 9 before then passing through an intensity modulator 11. The gate is opened and closed cyclically by the intensity modulator 11 so that only the pumping light is extracted. The optical intensity of the extracted pumping light is amplified by an EDFA (Erbium Doped Fiber Amplifier) 13 before passing through an isolator 15 and being guided to the sensing fiber 17 which is attached to the apparatus main body 1 via the first connector 170c and second connector 170d.

The other light split by the coupler 7 is used as the probe light. A time delay is applied as a result of the probe light passing through the fiber delay 19 so that the probe light passes through the sensing fiber 17 at the same time as the pumping light. The delayed probe light passes through a polarization controller 20 before passing through an isolator 21 and being introduced to the sensing fiber 17 via the opposite end from the pumping light entry end.

Thus, the pumping light and probe light, which are outputted from the light source 3, are inputted in opposite directions via the both ends of the sensing fiber 17. Further, Brillouin scattering is generated as a result of the pumping light being propagated within the sensing fiber 17. As a result of the Brillouin scattering, the probe light mainly obtains gain in the correlation peak position.

The probe light obtained with gain due to the Brillouin scattering is emitted via the pumping light entry end and is extracted via the coupler 7 disposed between the sensing fiber 17 and the isolator 15. The light components other than the probe light are removed by the optical filter 25, and then only the probe light obtained with gain due to the Brillouin scattering is extracted. The probe light is received by a PD27 and converted into an electrical signal. The BGS is measured as a result of the PD2 receiving the probe light obtained with Brillouin gain due to the entering of the pumping light and probe light set at the respective frequency differences to the sensing fiber 17 in opposite directions. The electrical signal corresponding to the probe light obtained with the Brillouin gain is then inputted to a lock-in amplifier 29. The lock-in amplifier 29 performs synchronization detection in sync with the intensity modulator 11. The electrical signal, which is inputted to the lock-in amplifier 29, is amplified and inputted to the computer 31.

The apparatus main body 1 comprises a computer 31 (control unit) and the computer 31 comprises a CPU, RAM, and ROM and hard disk and so forth as hardware and functions as an analysis section 33, an anomaly judgment section 35, and a reporting section 37.

The analysis section 33 receives an input of an electrical signal of the probe light obtained with Brillouin gain and analyzes the Brillouin gain obtained as a result of the probe light undergoing Brillouin scattering. The anomaly judgment section 35 comprises a memory 350 in which various reference data utilized in the anomaly detection are stored. The anomaly judgment section 35 judges an anomaly of regard to the temperature or strain of the sensing fiber 17 on the basis of the analysis result of the analysis section 33. The reporting section 37 outputs an alarm signal for reporting an anomaly and reports the anomaly in cases where the anomaly judgment section 35 judges that an anomaly exists.

Figure 3:
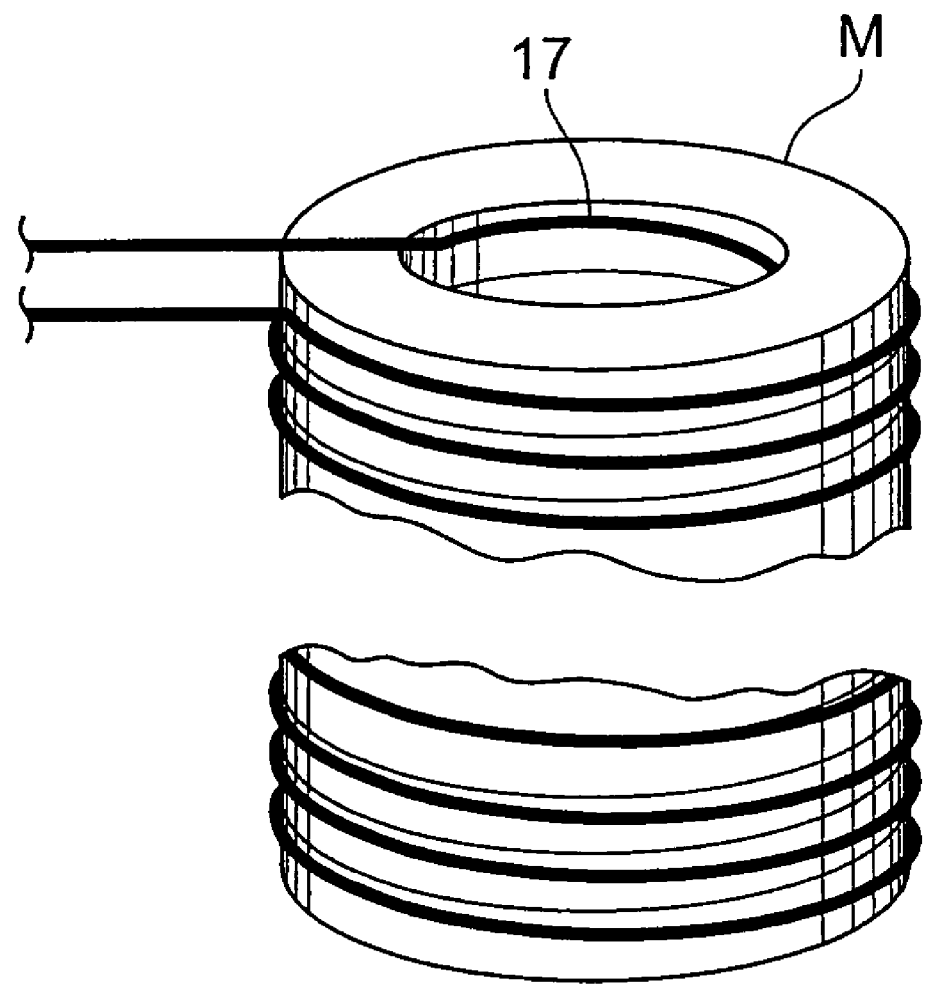
FIG. 3 is a view showing an example of the disposition of a sensing fiber which the spectral measurement apparatus according to the present invention comprises.

In the apparatus main body 1, the sensing fiber 17 is disposed on object M as shown in FIG. 3 and senses an anomaly of regard to the temperature or strain of object M. FIG. 3 is a view showing an example of the disposition of the sensing fiber which the spectral measurement apparatus according to the present invention comprises.

Object M is a superconductive coil of a high-temperature superconducting motor, for example. In order to keep the superconductive coil in a superconductive state, it is necessary to keep the superconductive material at or below a fixed temperature. Furthermore, the current, which is able to flow in the superconductive material, depends on the temperature of the superconductive material. For this reason, measurement of the temperature distribution of the superconductive coil is essential. Object M is formed as a hollow cylinder on which a reel with a plurality of windings formed as rings by winding the superconductive material in a reel shape is laid.

The sensing fiber 17 is wound in a helical shape along the inside and outside of object M and provided so that a circuit is made of the inside and outside respectively of each reel. Thus, the respective positions in the longitudinal direction of the sensing fiber 17 are preferably disposed opposite the respective positions of object M.

The first to third methods of sensing an anomaly using the spectral measurement apparatus with the above structure will be described next.

(First Anomaly Sensing Method)

Figure 4:
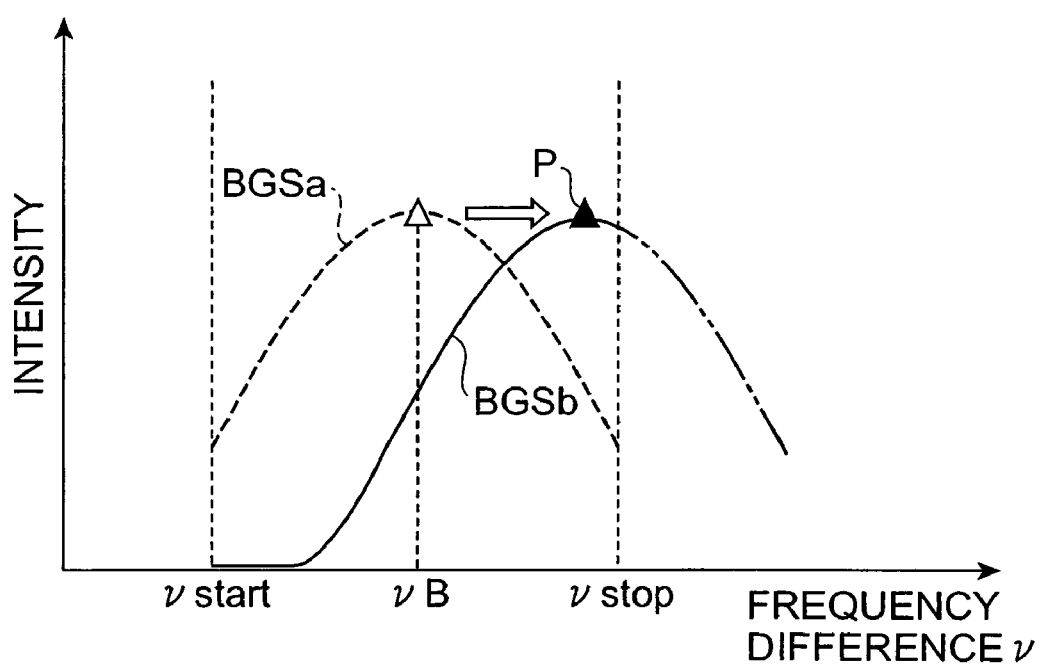
FIG. 4 is a graph for explaining a first method of sensing an anomaly of the spectral measurement apparatus according to the present invention.

In the first anomaly sensing method, the light source 3 sweeps the frequency difference ν between the pumping light and probe light in a predetermined range (frequency difference setting range) and the analysis section 33 analyzes the Brillouin gain received by the probe light with respect to the frequency difference ν within a predetermined range. FIG. 4 is a graph for explaining the first anomaly sensing method according to the embodiment. In FIG. 4, the horizontal axis represents the frequency difference ν and the vertical axis is the intensity of the Brillouin gain which is received by the probe light in a certain correlation peak position.

The BGS indicated by the curved broken line in FIG. 4 is a reference BGSa when the temperature and strain of the sensing fiber 17 are in the reference state. The reference state is a state where the temperature of object M on which the sensing fiber 17 is disposed is normal. The maximum value of the reference BGSa is a peak value g0 and the frequency difference ν with which peak value g0 is obtained is the peak frequency difference νB.

The predetermined range is set at a range from the frequency difference νstart to the frequency difference νstop which includes the peak frequency difference νB of the reference BGSa. Further, the width of the predetermined range is set at a width at or below the line width of the reference BGSa. The width of the predetermined range is preferably set on the basis of the shift amount of the peak frequency difference which is obtained in a case where the BGS is measured by using the sensing fiber 17 in the normal temperature range of object M.

In cases where object M is a superconductive coil, the superconductive coil is driven while immersed in liquid nitrogen and, when the temperature of object M is in the range 67 to 77K, it may be said that the high-temperature superconducting motor is operating normally. In this case, frequency difference vstart is desirably set as the peak frequency difference when the temperature of the sensing fiber 17 is 67K and the frequency difference vstop is desirably set as the peak frequency difference when the temperature of the sensing fiber 17 is 77K. The width of the predetermined range at this time is on the order of a few MHz to 10 MHz. The width of the predetermined range may also be set narrower in view of the temperature margin.

The analysis section 33 analyzes the Brillouin gain of the range from the frequency difference vstart to the frequency difference vstop in each position of the sensing fiber 17 and obtains the BGSb corresponding to each position. The BGSb corresponds to a part of BGS1 shown in FIG. 1. In the anomaly sensing process of the anomaly sensing apparatus 1, the analysis section 33 does not normally analyze the Brillouin gain with respect to the frequency difference v outside a predetermined range.

The anomaly judgment section 35 judges an anomaly on the basis of whether there is a maximum value P for the BGSb analyzed by the analysis section 33. When the anomaly judgment section 35 judges an anomaly, the result of the analysis by the analysis section 33 to be used is the result of analysis by the analysis section 33 by using pumping light and probe light which have a frequency difference v within a predetermined range, and does not include a result analyzed by the analysis section 33 by using pumping light and probe light which have a frequency difference v outside a predetermined range.

In cases where there is a maximum value P for BGSb, this signifies that the peak value exists in a predetermined range and the change in the temperature of the sensing fiber 17 is from the reference state to a temperature equal to or less than the predetermined value. That is, the anomaly judgment section 35 judges that there is no anomaly in cases where there is a maximum value P in the analyzed BGSb as shown in FIG. 4. In cases where the intensity of the Brillouin gain increases monotonically or decreases monotonically with the frequency difference v, and there is no maximum value P, this signifies that the peak value exists outside the predetermined range and the temperature or strain of the sensing fiber 17 has changed by a value greater than a predetermined value from the reference state. That is, the anomaly judgment section 35 judges that an anomaly exists in cases where there is no maximum value P.

The anomaly judgment section 35 measures the temperature of the sensing fiber 17 on the basis of the peak frequency difference in cases where the maximum value P exists. More specifically, the anomaly judgment section 35 stores a database which associates the peak frequency difference and temperature of the sensing fiber 17 beforehand and sets the temperature which is associated with the measured peak frequency difference in the database as the temperature measurement value.

The operation of the spectral measurement apparatus in cases where the first anomaly sensing method is used will be described next. When the measurement is started, the phase difference between the pumping light and probe light is set by the light source 3 so that the correlation peak position is the measurement start position of the sensing fiber 17. Further, the BGSb in the predetermined range is analyzed by the analysis section 33 by sweeping the frequency difference v between the pumping light and probe light from the frequency difference vstart to frequency difference vstop.

The existence of anomaly is judged by the anomaly judgment section 35 on the basis of whether there is a maximum value P for the analyzed BGSb. In cases where it is judged by the anomaly judgment section 35 that there is no anomaly, settings are made so that the correlation peak position is then in the next measurement position. When it is judged by the anomaly judgment section 35 that there is no anomaly, the BGSb in the respective positions in the longitudinal direction of the sensing fiber 17 are measured one by one and an anomaly is judged. In either position, in cases where it is judged by the anomaly judgment section 35 that an anomaly exists, an alarm signal for reporting the anomaly is outputted from the alarm signal output section.

For example, the control unit of the superconducting motor (not shown) may be controlled such that the temperature of the superconductive coil (object M) drops in accordance with the alarm signal or settings may be made so that the operation of the superconducting motor is turned OFF. Thus, the burn-out the superconductive coil can be prevented.

According to the spectral measurement apparatus described above, the analysis of the Brillouin gain by the analysis section 33 is with respect to a frequency difference of a predetermined range in which the frequency difference, at which the peak value of the reference gain spectrum is obtained, is included, when a state relating to the temperature or strain of the sensing fiber 17 is judged, adequate information can be obtained. Further, the analysis is performed with respect to a frequency difference of the predetermined range which is equal to or less than the line width of the reference gain spectrum and there is no need to analyze the frequency difference outside the predetermined range. Hence, the measurement and analysis time of the Brillouin gain can be shortened. That is, a judgment of the state of the temperature or strain can be performed more rapidly. Furthermore, because an alarm signal for reporting an anomaly is outputted, an anomaly can be rapidly reported.

The analysis section 33 analyzes the spectrum of the gain received by the probe light with respect to the frequency difference within a predetermined range and the anomaly judgment section 35 judges the existence of an anomaly on the basis of the existence of the maximum value of the spectrum analyzed by the analysis section 33. In this case, the fact that the maximum value is not included in the spectrum analyzed by the analysis section 33 indicates that the frequency difference obtaining the peak value of the spectrum of the Brillouin gain obtained by the probe light is shifted by a value equal to or more than a predetermined value. This signifies the fact that the temperature or strain of the sensing fiber 17 has changed by a predetermined amount or more. That is, a temperature anomaly of the sensing fiber 17 can be judged reliably and rapidly on the basis of the existence of the maximum value of the spectrum of the gain received by the probe light with respect to the frequency difference within the predetermined range.

Further, because the sensing fiber 17 is disposed on the object M, the temperature of the sensing fiber 17 changes in accordance with a change in the temperature of the object M, and therefore an anomaly of the object can be judged by judging an anomaly of the sensing fiber 17.

For example, a conventional apparatus and the spectral measurement apparatus are compared in a case where the Brillouin gain is measured and analyzed with an interval of 2 MHz and a sampling rate of 8.8 Hz. In the case of the conventional apparatus, the Brillouin gain is swept in the range of the frequency difference 10.8 to 11.0 GHz and all of the BGS also including part of the foot is analyzed as shown in FIG. 1. That is, in order to grasp the temperature state at one point of the sensing fiber with the conventional apparatus, measurement and analysis of the Brillouin gain at 100 frequency difference points is carried out. That is, it takes approximately 0.1 second to grasp the temperature state at one point of the sensing fiber. That is, in cases where the temperature distribution of the sensing fiber is measured by performing temperature measurement at 100 points in the longitudinal direction of the sensing fiber, the measurement takes on the order to 10 seconds.

In contrast, with the spectral measurement apparatus according to this embodiment, in cases where the normal temperature range of object M is 10° C., the change in the peak frequency with respect to a change in the temperature of a general single mode fiber is on the order of 1 MHz/° C. and, therefore, the width νstop-νstart of the predetermined range is on the order of 10 MHz. Thereupon, in order to grasp the temperature state at one point of the sensing fiber, the Brillouin gain is measured and analyzed at five frequency difference points. The time taken to measure and analyze the Brillouin gain for one frequency difference is 1 ms and, in cases where the temperature distribution of the sensing fiber is measured by performing temperature measurement at 100 points in the longitudinal direction of the sensing fiber 17, the measurement takes on the order of 1 ms×5×100=0.5 second. That is, in the spectral measurement apparatus according to this embodiment, sensing of a temperature anomaly can be carried out at 0.5 second intervals and an anomaly can be sensed in a small time interval which is on the order of 20 times smaller than that with a conventional apparatus.

In addition, supposing that the Brillouin gain is to be measured over a wide frequency range as is the case with a conventional apparatus, the wavelengths transmitted by the optical filter must be changed. In contrast, with the spectral measurement apparatus according to this embodiment, because the frequency range for measurement and analysis is kept to a narrow range of the predetermined range, the wavelengths transmitted by the optical filter 25 can be fixed. That is, a less costly and simpler apparatus can be provided.

Moreover, in the direct frequency modulation, because the frequency difference is changed by changing the current applied to the LD, the wide frequency range to be measured and the linearity of the applied current and oscillation frequency are not maintained. The spectral measurement apparatus according to this embodiment has a narrower frequency range than that of conventional apparatuses and retains a higher linearity. As a result, the frequency difference ν of the light source 3 can be controlled accurately.

In the above embodiment, the width of the predetermined range (frequency difference setting range) is made equal to or less than the line width of the reference BGSa. For example, the width of the predetermined range may be equal to or less than the 10% full width of the BGS (the full width when the Brillouin gain is 10% of the peak value). In cases where a general single mode fiber is used as the sensing fiber 17, the 10% full width of the BGS is on the order of 90 MHz. Furthermore, for example, the width of the predetermined range may be equal to or less than the 20% full width of the BGS (the full width when the Brillouin gain is 20% of the peak value). In cases where the general single mode fiber is used as the sensing fiber 17, the 20% full width of the BGS is on the order of 60 MHz.

Furthermore, the width of the predetermined range may be equal to or less than the full width at half maximum of the BGS, for example. In cases where a general single mode fiber is used as the sensing fiber 17, the full width at half maximum of the BGS may be on the order of 30 MHz. Furthermore, for example, the width of the predetermined range may be equal to or less than the half value width of the BGS. In cases where a general single mode fiber is used as the sensing fiber 17, the half value width of the BGS is on the order of 15 MHz.

(Second Anomaly Sensing Method)

In the second anomaly sensing method, the analysis section 33 analyzes the Brillouin gains g1b, g2b received by the probe light with respect to two frequency differences ν1 and ν2 included in the predetermined range (frequency difference setting range), for each measurement position. The anomaly judgment section 35 judges the existence of an anomaly by comparing the ratio g1b/g2b between two Brillouin gains g1b and g2b which are analyzed by the analysis section 33 and a predetermined ratio (reference data which are pre-stored in the memory 350). The predetermined ratio is the ratio g1/g2 between the Brillouin gain g1 of the frequency difference ν1 and the Brillouin gain g2 of the frequency difference ν2 of the reference BGSa obtained when the temperature and strain of the sensing fiber 17 are in the reference state (normal state).

Figure 5:
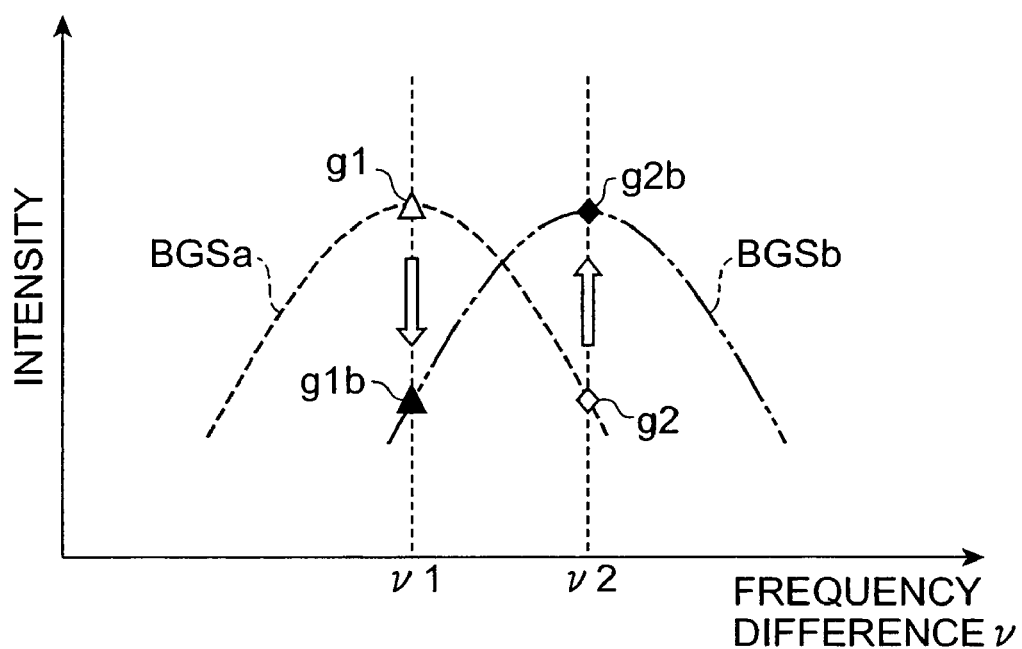
FIG. 5 is a graph for explaining a second method of sensing an anomaly of the spectral measurement apparatus according to the present invention.

FIG. 5 is a graph for explaining the second anomaly sensing method. In FIG. 5, the horizontal axis represents the frequency difference ν and the vertical axis represents the intensity of the Brillouin gain received by the probe light in a certain correlation peak position. The broken line curve shown in FIG. 5 is the reference BGSa that is obtained in the reference state. The curve indicated by the two-dot chain line represents the BGSb in a case where the frequency difference is measured by sweeping in a range on the order of the line width of the BGS.

For example, when the frequency difference ν1 is set at the frequency difference obtaining the peak value of the reference BGSa as shown in FIG. 5, because the Brillouin gain g1 is the maximum value of the reference BGSa, the predetermined ratio g1/g2 is maximum. That is, the smaller the analyzed ratio g1b/g2b is than the predetermined ratio g1/g2, the more the temperature and strain of the sensing fiber 17 is displaced from the reference state.

In this case, when the anomaly judgment section 35 compares the analyzed ratio g1b/g2b with the predetermined ratio g1/g2 and the ratio g1b/g2b is equal to or less than a predetermined proportion of the predetermined ratio g1/g2, an anomaly is judged to exist. The anomaly judgment section 35 judges that there is no anomaly when the ratio g1b/g2b is greater than a predetermined proportion of the predetermined ratio g1/g2. Thus, a temperature anomaly of the sensing fiber 17 can be judged in a reliable manner. In particular, the second anomaly sensing method is capable of highly sensitive measurement even when the normal temperature range of object M is narrower.

When the second anomaly sensing method is used with the spectral measurement apparatus, because an anomaly can be judged by measuring and analyzing the Brillouin gain with respect to two frequency differences ν1 and ν2, the anomaly sensing interval can be shortened. For example, in cases where the time taken to measure one Brillouin gain is on the order of 1 ms and the temperature distribution of the sensing fiber is measured by performing temperature measurement at 100 points in the longitudinal direction of the sensing fiber 17, the measurement takes on the order of 1 ms×2 times×100 points=0.2 second. That is, the spectral measurement apparatus according to this embodiment is capable of temperature anomaly sensing in 0.2 second intervals.

Figure 6:
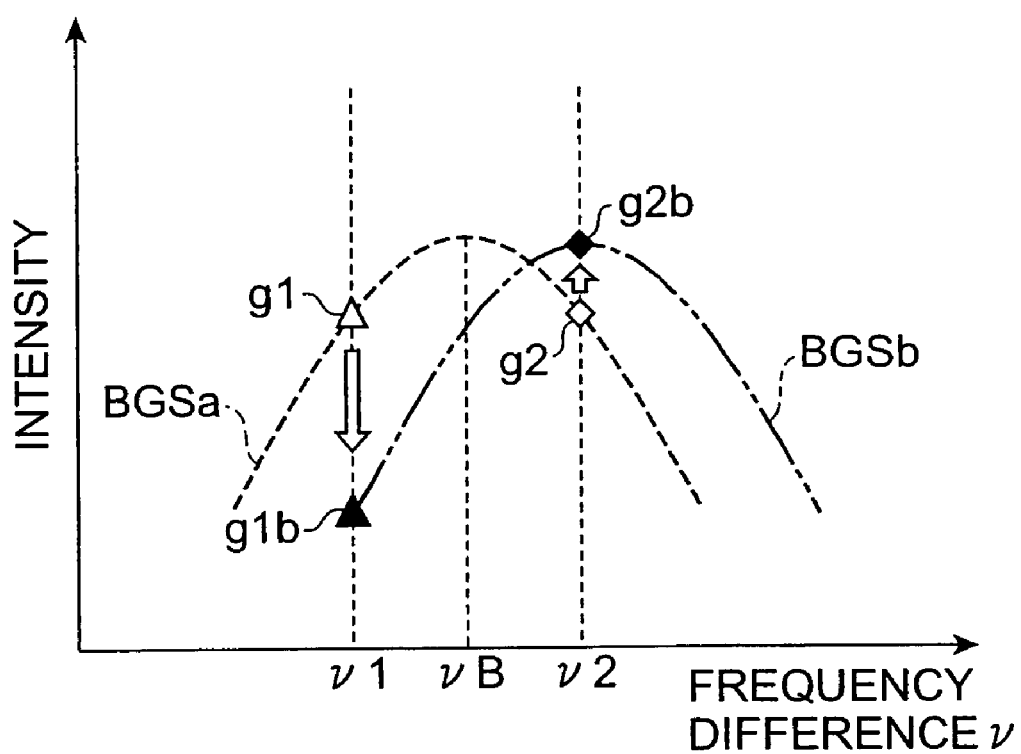
FIG. 6 is a graph for explaining a modified example of the second method of sensing an anomaly of the spectral measurement apparatus according to the present invention (Part 1)
Figure 7:
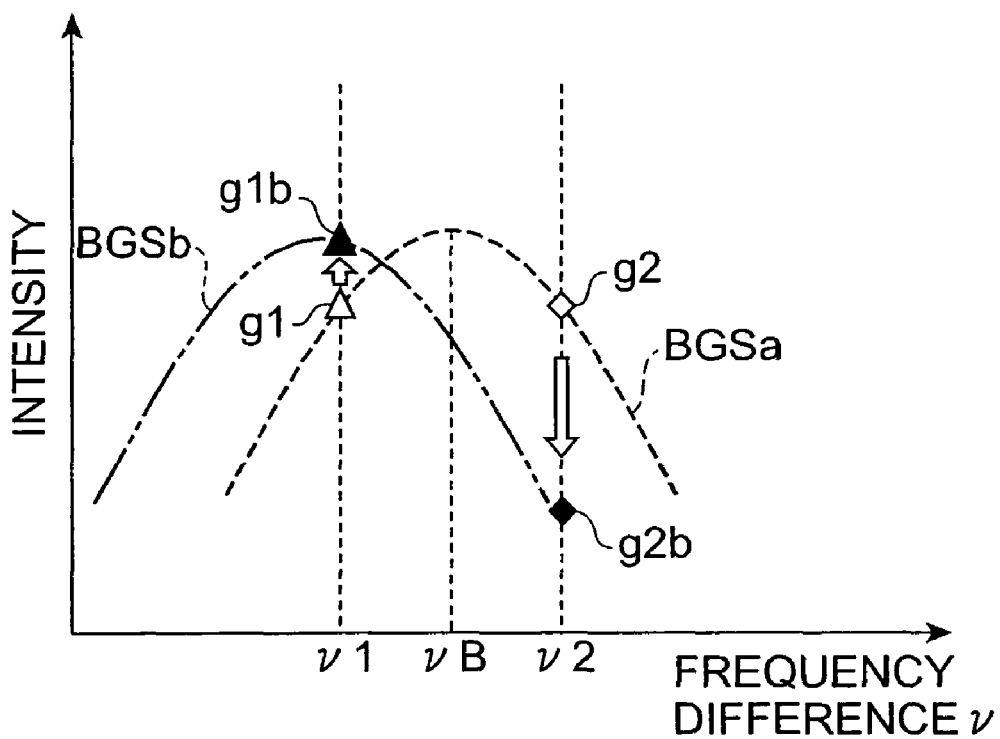
FIG. 7 is a graph for explaining a modified example of the second method of sensing an anomaly of the spectral measurement apparatus according to the present invention (Part 2)

FIGS. 6 and 7 are graphs for explaining a modified example of the second anomaly sensing method. In FIGS. 6 and 7, the horizontal axis indicates the frequency difference ν and the vertical axis indicates the intensity of the Brillouin gain received by the probe light in a certain correlation peak position.

For example, as shown in FIG. 6, when the frequency difference ν1 and frequency difference ν2 are set such that the average of the two frequency differences ν1 and ν2 is the peak frequency of the reference BGSa, the predetermined ratio g1/g2 is 1. In this case, as shown in FIG. 6, when the temperature of the sensing fiber 17 rises, the BGSb shifts toward a higher frequency and the ratio g1b/g2b thus analyzed grows smaller. Furthermore, as shown in FIG. 7, when the temperature of the sensing fiber 17 drops, the BGSb shifts toward a lower frequency and the analyzed ratio g1b/g2b grows larger.

The anomaly judgment section 35 compares the analyzed ratio g1b/g2b with the predetermined ratio g1/g2 and it is judged that an anomaly exists when the ratio g1b/g2b is less than or greater than a predetermined proportion of 1. The anomaly judgment section 35 compares the analyzed ratio g1b/g2b with the predetermined ratio g1/g2 and, when the ratio g1b/g2b changes within a predetermined proportion of 1, it is judged that there is no anomaly.

The difference between the analyzed frequency differences v1 and v2 may be equal to or less than the full width at half maximum of the BGS. For example, in the case of a general single mode fiber, settings are preferably made so that this difference is equal to or less than 30 MHz which is the full width at half maximum of the BGS.

(Third anomaly sensing method) In the third anomaly sensing method, the analysis section 33 analyzes the gain received by the probe light with respect to one frequency difference v1 included in the predetermined range (frequency difference setting range), for each measurement position. The anomaly judgment section 35 judges the existence of an anomaly by comparing one gain g0a analyzed by the analysis section 33 with a predetermined value (the reference data pre-stored in the memory 350). The predetermined value is the Brillouin gain g1 of the frequency difference v1 of the reference BGSa which is obtained when the temperature and strain of the sensing fiber 17 are in the reference state (normal state).

Figure 8:
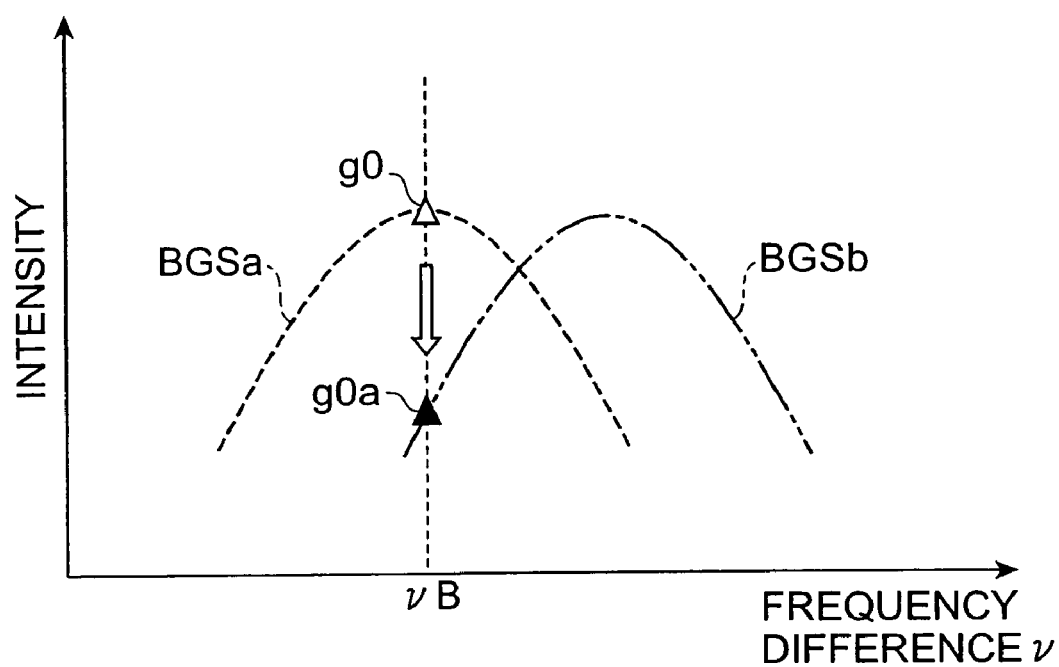
FIG. 8 is a graph for explaining a third method of sensing an anomaly of the spectral measurement apparatus according to the present invention.

FIG. 8 is a graph for explaining a third anomaly sensing method. In FIG. 8, the horizontal axis represents the frequency difference v and the vertical axis represents the intensity of the Brillouin gain received by the probe light in a certain correlation peak position. The broken line curve shown in FIG. 8 is the reference BGSa that is obtained in the reference state. The curve indicated by the two-dot chain line represents the BGSb in a case where the frequency difference is measured by sweeping in a range on the order of the line width of the BGS.

For example, when the frequency difference v1 is set as the frequency difference vB at which the peak value of the reference BGSa is obtained as shown in FIG. 8, the Brillouin gain g1 takes the maximum value (peak value g0) of the reference BGSa. That is, the smaller the analyzed Brillouin gain g0a is than the predetermined value (peak value g0), the more the temperature and strain of the sensing fiber 17 is displaced from the reference state.

The anomaly judgment section 35 compares the Brillouin gain g0a measured with respect to the frequency difference v1 (vB) with the predetermined value g0 and, when the Brillouin gain g0a is equal to or less than a predetermined proportion of the predetermined value g0, judges that an anomaly exists. The anomaly judgment section 35 judges that there is no anomaly when the Brillouin gain g0a is within a predetermined proportion of the predetermined value g0. Thus, a temperature anomaly of the sensing fiber 17 can be judged in a reliable manner. In particular, the third anomaly sensing method is effective in cases where a high measurement speed is required.

When the third anomaly sensing method is used with the spectral measurement apparatus, because an anomaly can be judged by measuring and analyzing the Brillouin gain with respect to one frequency difference v1, the anomaly sensing interval can be shortened. For example, in cases where the time taken to measure one Brillouin gain is on the order of 1 ms and the temperature distribution of the sensing fiber is measured by performing temperature measurement at 100 points in the longitudinal direction of the sensing fiber 17, the measurement takes on the order of 1 ms×100 points=0.1 second. That is, the spectral measurement apparatus according to this embodiment is capable of temperature anomaly sensing in a 0.1 second interval.

Figure 9:
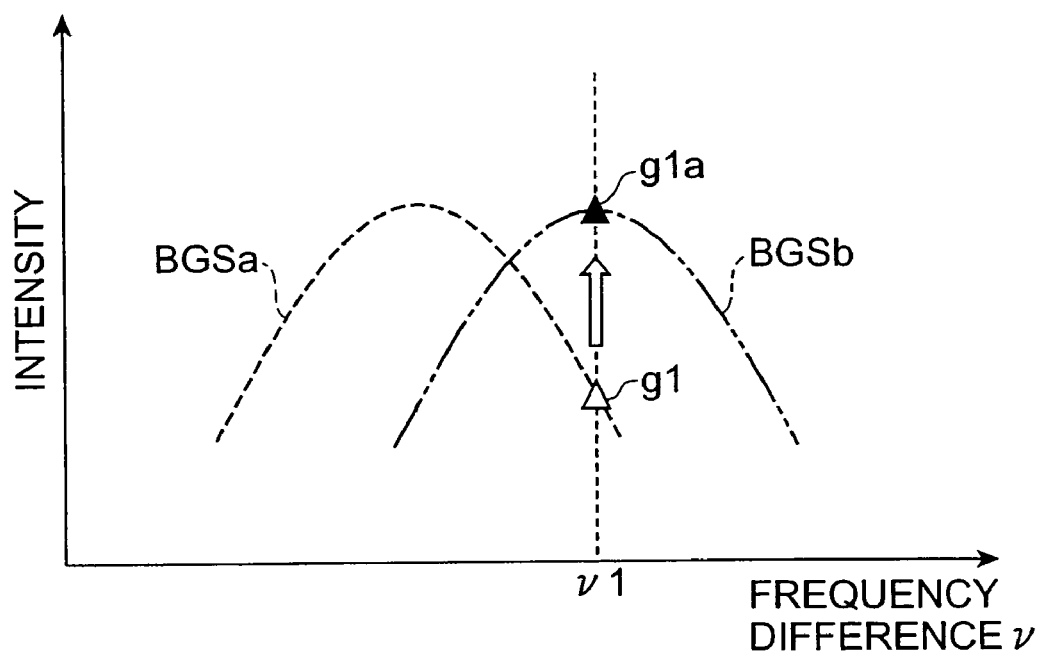
FIG. 9 is a graph for explaining a first modified example of the third method of sensing an anomaly of the spectral measurement apparatus according to the present invention.

FIG. 9 is a graph for explaining the first modified example of the third anomaly sensing method. In FIG. 9, the horizontal axis represents the frequency difference v and the vertical axis represents the intensity of the Brillouin gain which is received by the probe light in a certain correlation peak position.

As shown in FIG. 9, the frequency difference v1 is set at a higher frequency within the predetermined range and the Brillouin gain g1 for the reference BGSa is set at a relatively small value. In this case, when the temperature of the sensing fiber 17 rises and the BGSb shifts toward a higher frequency, the analyzed Brillouin gain g1a is greater than a predetermined value g1 and it can be sensed that the temperature of the sensing fiber 17 has shifted from the reference state.

In this case, the anomaly judgment section 35 compares the Brillouin gain g1a analyzed for the frequency difference v1 with the predetermined value g1 and, when the Brillouin gain g1a is equal to or more than a predetermined number of times the predetermined value g1, it is judged that an anomaly exists. The anomaly judgment section 35 judges that an anomaly does not exist when the Brillouin gain g1a is smaller than a predetermined number of times the predetermined value g1.

For example, when the Brillouin gain g1 obtained for the frequency difference v1 is provided as a reference value when the sensing fiber 17 is at the highest temperature within the normal temperature range, it is possible to immediately sense the fact that the sensing fiber 17 is at a higher temperature than the normal temperature range.

Figure 10:
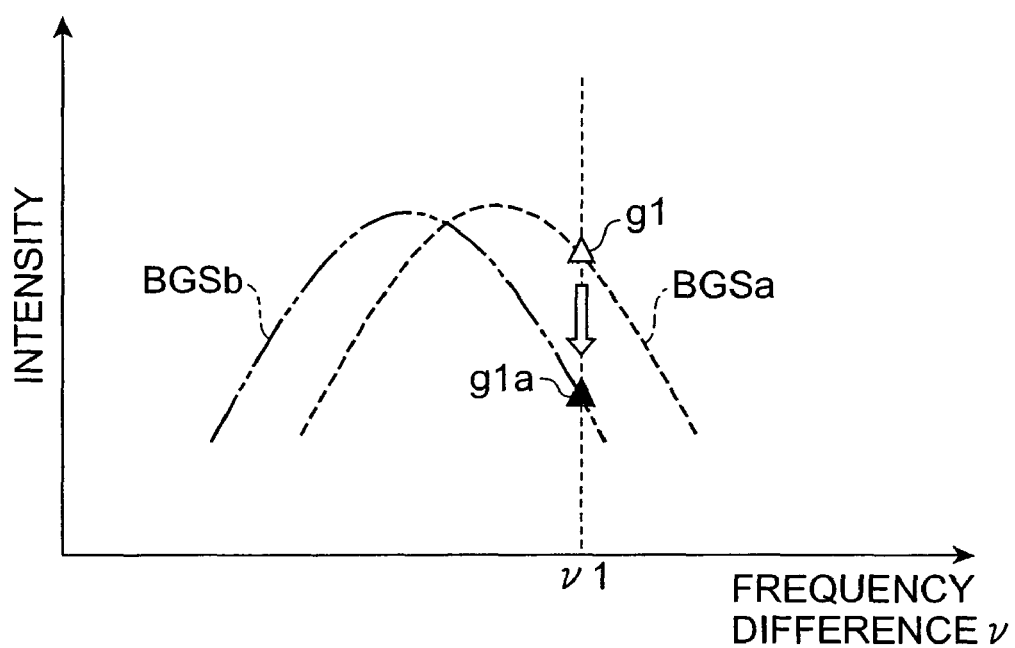
FIG. 10 is a graph for explaining a second modified example of the third method of sensing an anomaly of the spectral measurement apparatus according to the present invention.

FIG. 10 is a graph for explaining the second modified example of the third anomaly sensing method. In FIG. 10, the horizontal axis represents the frequency difference v and the vertical axis represents the intensity of the Brillouin gain received by the probe light in a certain correlation peak position.

As shown in FIG. 10, the frequency difference v1 is set to a higher frequency within the predetermined range and the Brillouin gain g1 for the reference BGSa is set to a relatively large value. In this case, when the temperature of the sensing fiber 17 drops and the BGSb shifts to a lower frequency, the analyzed Brillouin gain g1a is smaller than the predetermined value g1 and it can be sensed that the temperature of the sensing fiber 17 has shifted from the reference state.

In this case, the anomaly judgment section 35 compares the analyzed Brillouin gain g1a for the frequency difference v1 with predetermined value g1 and it is judged that an anomaly exists when the Brillouin gain g1a is equal to or less than a predetermined proportion of the predetermined value g1. The anomaly judgment section 35 judges that an anomaly does not exist when the Brillouin gain g1a is larger than a predetermined proportion of the predetermined value g1.

For example, by setting the Brillouin gain g1 obtained at the frequency difference v1 to the reference value when the sensing fiber 17 is at the lowest temperature within the normal temperature range, it can be sensed immediately that the sensing fiber 17 is at a lower temperature than the normal temperature range.

Figure 11:
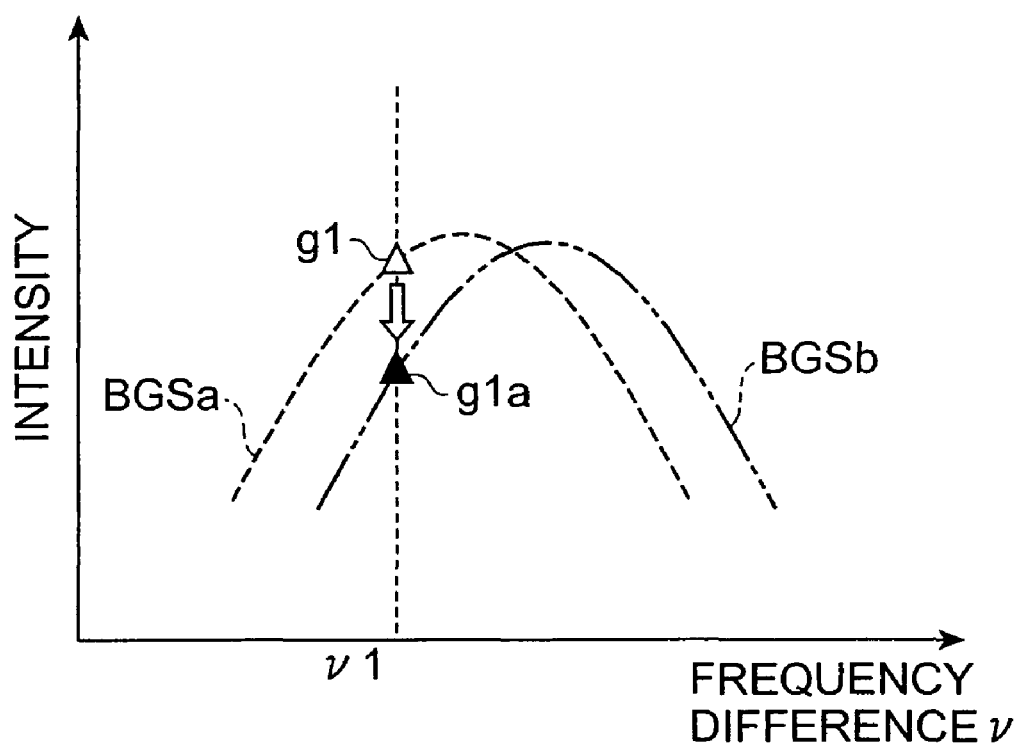
FIG. 11 is a graph for explaining a third modified example of the third method of sensing an anomaly of the spectral measurement apparatus according to the present invention.

FIG. 11 is a graph for explaining the third modified example of the third anomaly sensing method. In FIG. 11, the horizontal axis represents the frequency difference ν and the vertical axis represents the intensity of the Brillouin gain which is received by the probe light in a certain measurement position.

As shown in FIG. 11, the frequency difference ν1 is set at a lower frequency within the predetermined range and the Brillouin gain g1 for the reference BGSa is set at a relatively large value. In this case, when the temperature of the sensing fiber 17 rises and the BGSb shifts toward a higher frequency, the analyzed Brillouin gain g1a is smaller than a predetermined value g1 and it can be sensed that the temperature of the sensing fiber 17 has shifted from the reference state.

In this case, the anomaly judgment section 35 compares the Brillouin gain g1a analyzed for the frequency difference ν1 with the predetermined value g1 and, when the Brillouin gain g1a is equal to or less than a predetermined proportion of the predetermined value g1, it is judged that an anomaly exists. The anomaly judgment section 35 judges that an anomaly does not exist when the Brillouin gain g1a is larger than a predetermined proportion of the predetermined value g1.

Figure 12:
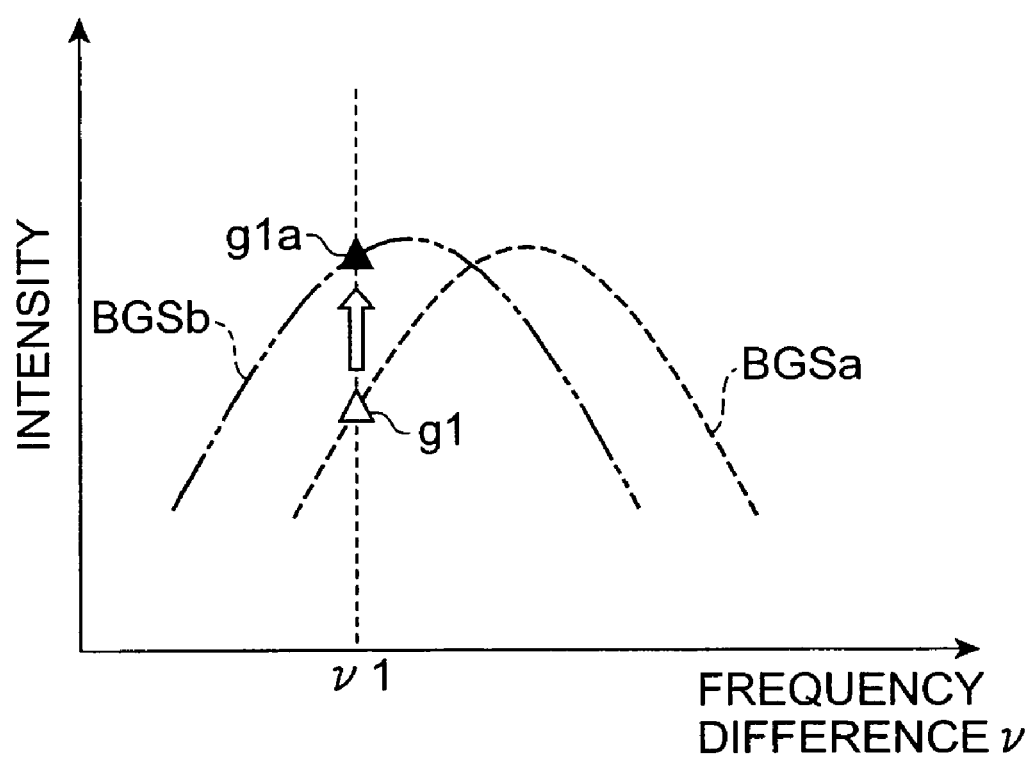
FIG. 12 is a graph for explaining a fourth modified example of the third method of sensing an anomaly of the spectral measurement apparatus according to the present invention.

FIG. 12 is a graph for explaining the fourth modified example of the third anomaly sensing method. In FIG. 12, the horizontal axis represents the frequency difference ν and the vertical axis represents the intensity of the Brillouin gain received by the probe light in a certain measurement position.

As shown in FIG. 12, the frequency difference ν1 is set at a lower frequency within the predetermined range and the Brillouin gain g1 for the reference BGSa is set at a relatively small value. In this case, when the temperature of the sensing fiber 17 drops and the BGSb shifts toward a lower frequency, the analyzed Brillouin gain g1a is larger than a predetermined value g1 and it can be sensed that the temperature of the sensing fiber 17 has shifted from the reference state.

In this case, the anomaly judgment section 35 compares the Brillouin gain g1a analyzed for the frequency difference ν1 with the predetermined value g1 and, when the Brillouin gain g1a is equal to or more than a predetermined number of times the predetermined value g1, it is judged that an anomaly exists. The anomaly judgment section 35 judges that an anomaly does not exist when the Brillouin gain g1a is smaller than a predetermined number of times the predetermined value g1.

For example, when the frequency difference ν1 is set at the minimum frequency difference within the predetermined range, g1 is the minimum value of the lower frequencies within the predetermined range. That is, the larger the Brillouin gain g1a is than the predetermined value g1, the more the temperature and strain of the sensing fiber 17 have shifted from the reference state.

Although the object M is a superconductive coil in the above embodiments, the measurement object of the spectral measurement apparatus according to the present invention is not limited to a superconductor. Furthermore, although the spectral measurement apparatus was described in the above embodiments as an apparatus for sensing a temperature anomaly, the spectral measurement apparatus is able to measure changes in the strain in the same manner and can be employed as an apparatus for sensing a strain anomaly. Furthermore, in the above embodiment, the spectral measurement apparatus uses BOCDA to measure the Brillouin gain but may also perform measurement using BOTDR (Brillouin Optical Time Domain Reflectometry) and BOTDA (Brillouin Optical Time Domain Analysis).

As described hereinabove, the invention makes it possible to judge the state of the temperature or strain of the optical fiber more quickly.

From the invention thus described, it will be obvious that the embodiments of the invention may be varied in many ways. Such variations are not to be regarded as a departure from the scope of the invention, and all such modifications as would be obvious to one skilled in the art are intended for inclusion within the scope of the following claims.

What is claimed is:

1. A spectral measurement apparatus measuring spectral changes of Brillouin scattered light generated within an optical fiber for being provided to an object, comprising:
    a light source outputting pumping light and probe light which are to be caused to enter in opposite directions to each end of the optical fiber;
    a probe light output-end for supplying the probe light outputted from said light source to one end of the optical fiber;
    a pumping light output-end for supplying the pumping light outputted from said light source to the other end of the optical fiber;
    an analysis section for analyzing a gain received by the probe light as a result of Brillouin scattering which is generated due to the propagation of the pumping light within the optical fiber; and
    a judgment section for judging the existence of a anomaly relating to a temperature or strain of the optical fiber on the basis of the analysis result of said analysis section,
    wherein a frequency difference between the pumping light and the probe light, propagating within the optical fiber, is in a range including a frequency difference at which a peak value of the reference gain spectrum of the gain received by the probe light is obtained when the temperature or strain of the optical fiber is in a reference state, and is set within a frequency difference setting range equal to or less than a line width of the reference gain spectrum.

2. A spectral measurement apparatus according to claim 1, further comprising an optical fiber through which the probe light and pumping light propagate, as a sensor section.

3. A spectral measurement apparatus according to claim 1, further comprising: a first connector optically connecting one end of the optical fiber and said probe light output-end; and a second connector optically connecting the other end of the optical fiber and said pumping light output-end.

4. A spectral measurement apparatus according to claim 1, further comprising an alarm signal output section outputting an alarm signal for reporting an anomaly regarding the temperature or strain of the optical fiber on the basis of the judgment result of said judgment section.

5. A spectral measurement apparatus according to claim 4, wherein said analysis section analyzes a spectrum of the gain received by the probe light with respect to the frequency difference included in the frequency difference setting range, and
    wherein said judgment section judges the existence of an anomaly of the optical fiber on the basis of the existence of a maximum value of the gain spectrum analyzed by said analysis section.

6. A spectral measurement apparatus measuring spectral changes of Brillouin scattered light generated within an optical fiber for being provided to an object, comprising:
    a light source outputting pumping light and probe light which are to be caused to enter in opposite directions to each end of the optical fiber;
    a probe light output-end for supplying the probe light outputted from said light source to one end of the optical fiber;

a pumping light output-end for supplying the pumping light outputted from said light source to the other end of the optical fiber;

an analysis section for analyzing a gain received by the probe light as a result of Brillouin scattering which is generated due to the propagation of the pumping light within the optical fiber; and a judgment section for judging a state relating to a temperature or strain of the optical fiber on the basis of the analysis result of said analysis section, wherein a frequency difference between the pumping light and the probe light, propagating within the optical fiber, is in a range including a frequency difference at which a peak value of the reference gain spectrum of the gain received by the probe light is obtained when the temperature or strain of the optical fiber is in a reference state, and is set within a frequency difference setting range equal to or less than a line width of the reference gain spectrum, wherein said analysis section analyzes the gain received by the probe light with respect to two frequency differences included in the frequency difference setting range, and wherein said judgment section judges the existence of an anomaly of the optical fiber by comparing the ratio between the two gains analyzed by said analysis section and a preset reference ratio.

7. A spectral measurement apparatus measuring spectral changes of Brillouin scattered light generated within an optical fiber for being provided to an object, comprising:

a light source outputting pumping light and probe light which are to be caused to enter in opposite directions to each end of the optical fiber;

a probe light output-end for supplying the probe light outputted from said light source to one end of the optical fiber;

a pumping light output-end for supplying the pumping light outputted from said light source to the other end of the optical fiber;

an analysis section for analyzing a gain received by the probe light as a result of Brillouin scattering which is generated due to the propagation of the pumping light within the optical fiber; and a judgment section for judging a state relating to a temperature or strain of the optical fiber on the basis of the analysis result of said analysis section, wherein a frequency difference between the pumping light and the probe light, propagating within the optical fiber, is in a range including a frequency difference at which a peak value of the reference gain spectrum of the gain received by the probe light is obtained when the temperature or strain of the optical fiber is in a reference state, and is set within a frequency difference setting range equal to or less than a line width of the reference gain spectrum, wherein said analysis section analyzes the gain received by the probe light with respect to one frequency difference included in the frequency difference setting range; and wherein said judgment section judges the existence of an anomaly of the optical fiber by comparing one gain analyzed by said analysis section and a preset reference value.

8. A spectral measurement apparatus according to claim 2, further comprising:

a first coupler splitting the pumping light and probe light which are outputted from said light source;

delay means for delaying the pumping light or probe light thus split by the first coupler and outputting the delayed light to the optical fiber;

a second coupler extracting the probe light outputted from the optical fiber after obtaining gain in the optical fiber; and a photodiode receiving the probe light extracted by said second coupler, wherein said light source includes one light source alternately outputting the pumping light and the probe light.

9. A spectral measurement method, comprising the steps of:

providing an optical fiber to an object;

measuring a change in a physical quantity of the object by using a spectral measurement apparatus according to claim 1 while causing pumping light and probe light to enter in opposite directions via the both ends of the optical fiber thus disposed; and sensing an anomaly of the object on the basis of the measurement result.

10. A spectral measurement apparatus measuring spectral changes of Brillouin scattered light generated within an optical fiber for being provided to an object, comprising:

a light source outputting pumping light and probe light which are to be caused to enter in opposite directions to each end of the optical fiber;

a probe light output-end for supplying the probe light outputted from said light source to one end of the optical fiber;

a pumping light output-end for supplying the pumping light outputted from said light source to the other end of the optical fiber;

an analysis section for analyzing a gain received by the probe light as a result of Brillouin scattering which is generated due to the propagation of the pumping light within the optical fiber; and a judgment section for judging a state relating to a temperature or strain of the optical fiber on the basis of the analysis result of said analysis section, wherein a frequency difference between the pumping light and the probe light, propagating within the optical fiber, is in a range including a frequency difference at which a peak value of the reference gain spectrum of the gain received by the probe light is obtained when the temperature or strain of the optical fiber is in a reference state, and is set within a frequency difference setting range equal to or less than a line width of the reference gain spectrum, wherein said analysis section analyzes a spectrum of the gain received by the probe light with respect to the frequency difference included in the frequency difference setting range, and wherein said judgment section judges the existence of an anomaly of the optical fiber on the basis of the existence of a maximum value of the gain spectrum analyzed by said analysis section.

11. A spectral measurement apparatus according to claim 1, wherein a Brillouin gain spectrum, representing a gain which is obtained as a result of the Brillouin scattering generated in the optical fiber, has a full width at half maximum of 30 MHz or less.

* * * * *